Oct. 7, 1924.

R. L. WALKER

VARIOMETER

Filed Jan. 26, 1924

1,510,876

Inventor
Robert L. Walker.

By Mason Fenwick & Lawrence.
Attorneys

Patented Oct. 7, 1924.

1,510,876

UNITED STATES PATENT OFFICE.

ROBERT LEE WALKER, OF ATLANTA, GEORGIA, ASSIGNOR TO A. E. HILL MANUFACTURING CO., OF ATLANTA, GEORGIA, A CORPORATION OF GEORGIA.

VARIOMETER.

Application filed January 26, 1924. Serial No. 688,793.

*To all whom it may concern:*

Be it known that ROBERT L. WALKER, citizen of the United States, residing at Atlanta, in the county of Fulton and State of Georgia, has invented certain new and useful Improvements in Variometers; and he does hereby declare the following to be a full, clear, and exact description of the invention, such as will enable others skilled in the art to which it appertains to make and use the same.

This invention relates to an improved construction of inductance instrument for radio telegraphy or telephony, and more especially to an instrument known as a variometer, and a method of forming the same and means of tying the inductance windings to the instrument.

An object of the invention is to provide a suitable variometer which will be formed with very narrow rotor and stator rings, and with lattice bank windings, which will be tied to the opposite or lateral edges of the rings, thereby doing away with the usual inefficient form of rotor ball upon which the windings are usually wound.

A further object of the invention is to provide a variometer which will be highly efficient in use and quite inexpensive to manufacture.

Other objects will appear as the description proceeds.

In the accompanying drawings which form a part of my application,

Like characters of reference are used throughout the following specification and the accompanying drawings to designate corresponding parts.

Figure 1:
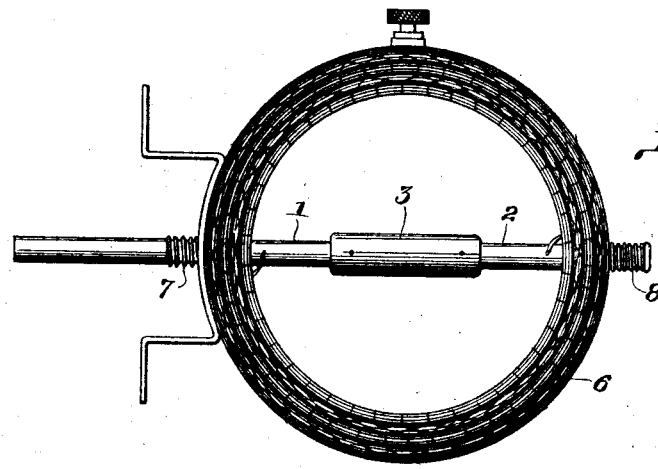
Fig. 1 is a side elevation of my improved variometer.
Figure 2:
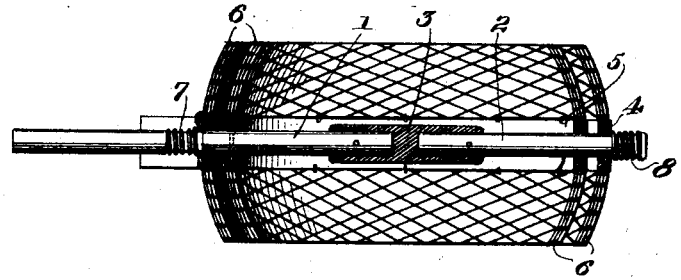
Fig. 2 is a transverse sectional view of my variometer.
Figure 3:
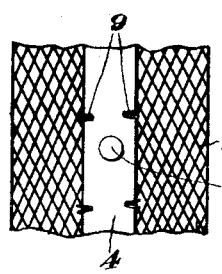
Fig. 3 is a detail view of one of the rings showing the method of tying the bank windings thereto.

In forming my improved variometer, I provide a sectional shaft formed of the pieces 1 and 2, which are held in alignment by means of a suitable insulator or bushing 3. A stator ring 4 is loosely mounted upon the shaft, while the rotor ring 5 is fixed thereto for movement with the said shaft, and is positioned concentrically within said stator ring.

It is my intention to employ lattice bank windings 6 for my variometer the same being slightly concaved in cross-section and being of slightly larger diameter where they are tied to the rotor and stator rings than at their free edges. Suitable springs 7 and 8 are positioned on the two portions of the shaft adjacent the outer surface of the stator ring 4 and provide good sliding contacts for the apparatus.

As before mentioned the rotor and stator windings are tied to the opposite edges, or to one edge of the rotor ring 5 and stator ring 4 by suitable ties 9, which are spaced about the said rings to evenly distribute and support the weight of the said windings.

From the foregoing description it will be understood that I have entirely done away with the usual moulded or ball construction for my variometer and have the windings so positioned and arranged that a gradual variation in inductance may be obtained at will over the entire range of values obtainable with the instrument. Also, since the old form of coils or windings on solid insulating material is done away with, and the lattice bank windings arranged as they are in my variometer, there is practically no distortion or material diffusion of the magnetic flux in the coils, thereby securing the maximum of electrical efficiency in the instrument. Successful sharp tuning of radio circuits, particularly as required for long distance work requires substantial isolation and separate adjustability for the capacity and the inductance of the circuit and obviously such a condition can be more nearly approached when the distributed capacity of the windings of inductance coils is reduced to a minimum, as is the case with my construction of variometer.

Many minor changes in detail of construction may be resorted to without departure from the spirit of the invention. For example, in my variometer the coils are attached to the supporting structures at one end or longitudinal limit by means of the ties or stitches 9, which secure an edge of each coil to the edge of its corresponding supporting ring. This method of attachment of the coils to their supporting structures or rings is preferred, but it is understood that any other suitable means of making such attachments, as for instance, binding the edges of the coils and the edges of their supporting structures or rings by means of adhesive material may be used without departure from the spirit of the invention.

Having thus described my invention what I claim as new and desire to secure by Letters Patent of the United States is:

1. In an inductance device, the combination of a supporting frame and a winding thereon, means for securing the winding on said frame, said means comprising spaced ties positioned between the adjacent edges of said frame and winding, and adapted to hold the same in operative position.

2. A variometer comprising an operating shaft, a stator ring loosely mounted thereon, a rotor ring fixed to said shaft and positioned concentrically of said stator ring and windings attached to the edges of said stator and rotor rings by means of suitable ties or stitchings.

3. A variometer comprising an insulated sectional operating shaft, a stator ring mounted thereon, a rotor ring fixed to said shaft concentric of said stator ring, windings attached to and supported by said stator and rotor rings by means of suitable ties or stitchings, said windings and rings extending in approximately the same planes.

4. A variometer comprising an insulated sectional operating shaft, a stator ring mounted thereon, a rotor ring fixed to said shaft concentric of said stator ring, windings attached to and supported by said stator and rotor rings, said windings and rings extending in approximately the same planes and spaced ties positioned between said rings and windings for holding the same in operative position.

In testimony whereof I affix my signature.

ROBERT LEE WALKER.